(12) United States Patent
Koh et al.

(10) Patent No.: US 8,004,208 B2
(45) Date of Patent: Aug. 23, 2011

(54) POWER SUPPLY SYSTEM AND METHOD (75) Inventors: Yat Chong Koh, Singapore (SG); Ching Sze Tey, Singapore (SG)

(73) Assignee: JDO Labs Pte Ltd., Singapore (SG)

( * ) Notice: Subject to any disclaimer, the term of this patent is extended or adjusted under 35 U.S.C. 154(b) by 378 days.

(21) Appl. No.: 12/376,082

(22) PCT Filed: Aug. 5, 2006

(86) PCT No.: PCT/SG2006/000223
§ 371 (c)(1),
(2), (4) Date: Feb. 2, 2009

(87) PCT Pub. No.: WO2008/018831
PCT Pub. Date: Feb. 14, 2008

(65) Prior Publication Data
US 2010/0007286 A1  Jan. 14, 2010

(51) Int. Cl.
*H05B 37/02* (2006.01)
(52) U.S. Cl. ........................................ 315/291; 315/307
(58) Field of Classification Search .................. 315/291, 315/294–311
See application file for complete search history.

(56) References Cited

U.S. PATENT DOCUMENTS

| 5,105,182 | A | 4/1992 | Shindo |
| 5,517,396 | A | 5/1996 | Murata |
| 5,917,711 | A | 6/1999 | Shikata et al. |
| 6,800,961 | B2 | 10/2004 | Basso |
| 6,933,686 | B1 * | 8/2005 | Bishel ............................ 315/293 |
| 2002/0047641 | A1 * | 4/2002 | Ito et al. ......................... 315/307 |
| 2004/0145926 | A1 | 7/2004 | Kanouda et al. |
| 2010/0308739 | A1 * | 12/2010 | Shteynberg et al. ........... 315/193 |

OTHER PUBLICATIONS

Written Opinion of the International Searching Authority for International Application No. PCT/SG2006/000223; dated May 4, 2007; 5 pages.

* cited by examiner

*Primary Examiner* — Don P Le
(74) *Attorney, Agent, or Firm* — Conley Rose, P.C.

(57) ABSTRACT

A power supply system and a method for providing power supply to electrical equipment from conventional lighting circuits in buildings are disclosed. The invention is intended to provide power supply to electrical equipment, without the need of conventional alternating current (AC) power supply power socket outlets. Instead, it obtains electrical power from existing lighting points. An embodiment of the invention is disclosed for achieving this without disrupting normal operation of turning on and off existing lighting sources. The present invention consists a wall switch unit and a lighting source control unit. The wall switch unit controls the level or waveforms of AC voltage supply to the lighting source control unit while the lighting source control unit detects the AC voltage level or waveforms for switching on or off a lighting source. Additionally, regardless of whether the lighting source is switched on or off, an uninterrupted power supply is derived from the lighting source control unit with this power supply being usable for electrically powering external electrical equipment connected thereto.

20 Claims, 8 Drawing Sheets

POWER SUPPLY SYSTEM AND METHOD

FIELD OF INVENTION

The present invention generally relates to power supplies for electrical equipment. Specifically, the present invention relates to a power supply system for providing additional, uninterrupted power supply to electrical equipment from conventional lighting circuits in buildings.

BACKGROUND

During installation of electrical wiring in a building, mains supply power socket outlets are typically positioned at locations where power requirement is anticipated. After the laying of the building's electrical wiring or construction is completed, it is generally difficult, inconvenient and costly to provide additional mains supply power socket outlets at alternative or additional locations within the building as the building's completed electrical wiring is embedded in conduits or within the walls of the building.

With current advancements in technology, more electrical equipment and sensors are being produced for various applications in homes or buildings including security, communication, monitoring and remote controlling. As the electrical equipment and sensors require an electrical power supply for operation, installation of these electrical equipment and sensors in homes or buildings with completed electrical wiring requires the addition of new electrical wiring to the homes or buildings which poses great difficulty, inconvenience and cost to owners of the homes or buildings. In some applications such as installation of a security system, there may be numerous security equipment and sensors positionally scattered throughout the entire home or building that require power supply. The electrical wiring installation for these security equipment and sensors is not only costly but time consuming as well.

Existing methods for installing additional electrical equipment in the homes or buildings include provision of electrical power supply to the additional electrical equipment by creating new electrical wiring from a position of the additional electrical equipment to a typical wall socket, which is cumbersome.

From the foregoing problems, it is apparent that there is a need for a quick, convenient and less costly way to install additional electrical equipment and sensors in existing homes or buildings with existing electrical wiring without adding to or altering the existing electrical wiring or disrupting the normal use of lighting.

SUMMARY

In accordance with a first aspect of the invention, there is disclosed a system for providing power supply to electrical equipments from conventional lighting circuits in buildings, the system comprising a detector, a converter and a power switching device. The detector is for receiving alternating current (AC) power supply having at least one property being detectable by the detector. The detector is for providing one of a plurality of control signals corresponding with the at least one property detectable by the detector. The converter is for converting the AC power supply into direct current (DC) power supply while the power switching device is for receiving the one of a plurality of control signals from the detector. The one of a plurality of control signals is for one of enabling and disabling switching of the power switching device for one of enabling and disabling flow of the AC power supply to an AC output.

In accordance with a second aspect of the invention, there is disclosed a power supply method for providing power supply to electrical equipments from conventional lighting circuits in buildings, the power supply method comprising the step of receiving alternating current (AC) power supply by a detector whereby the AC power supply has at least one property detectable by the detector. This is followed by correlating the at least one property to one of a plurality of control signals by the detector. The next step is for providing direct current (DC) power supply whereby the DC power supply is converted from the AC power supply by a converter. This is followed by reception of the one of a plurality of control signals by a power switching device whereby the one of a plurality of control signals is for one of enabling and disabling switching of the power switching device for one of enabling and disabling flow of the AC power supply to an AC output.

BRIEF DESCRIPTION OF THE DRAWINGS

Embodiments of the invention are described hereinafter with reference to the following drawings, in which.

DETAILED DESCRIPTION

A system and a method for providing additional, uninterrupted power supply to electrical equipment from conventional lighting circuits in buildings are described hereinafter for addressing the foregoing problems.

In the detailed description provided hereinafter and in the several figures of the drawings, like elements are assigned with like reference numerals, analogous but changed elements are assigned like reference numerals accompanied by the letter "A", and different elements are assigned different reference numerals. Reference is also made to two electrical states, an ON state and an OFF state. The ON state refers to the electrical state where a lighting source in a lighting circuit is being turned on while the OFF state refers to the electrical state where the lighting source is being turned off.

Figure 1:
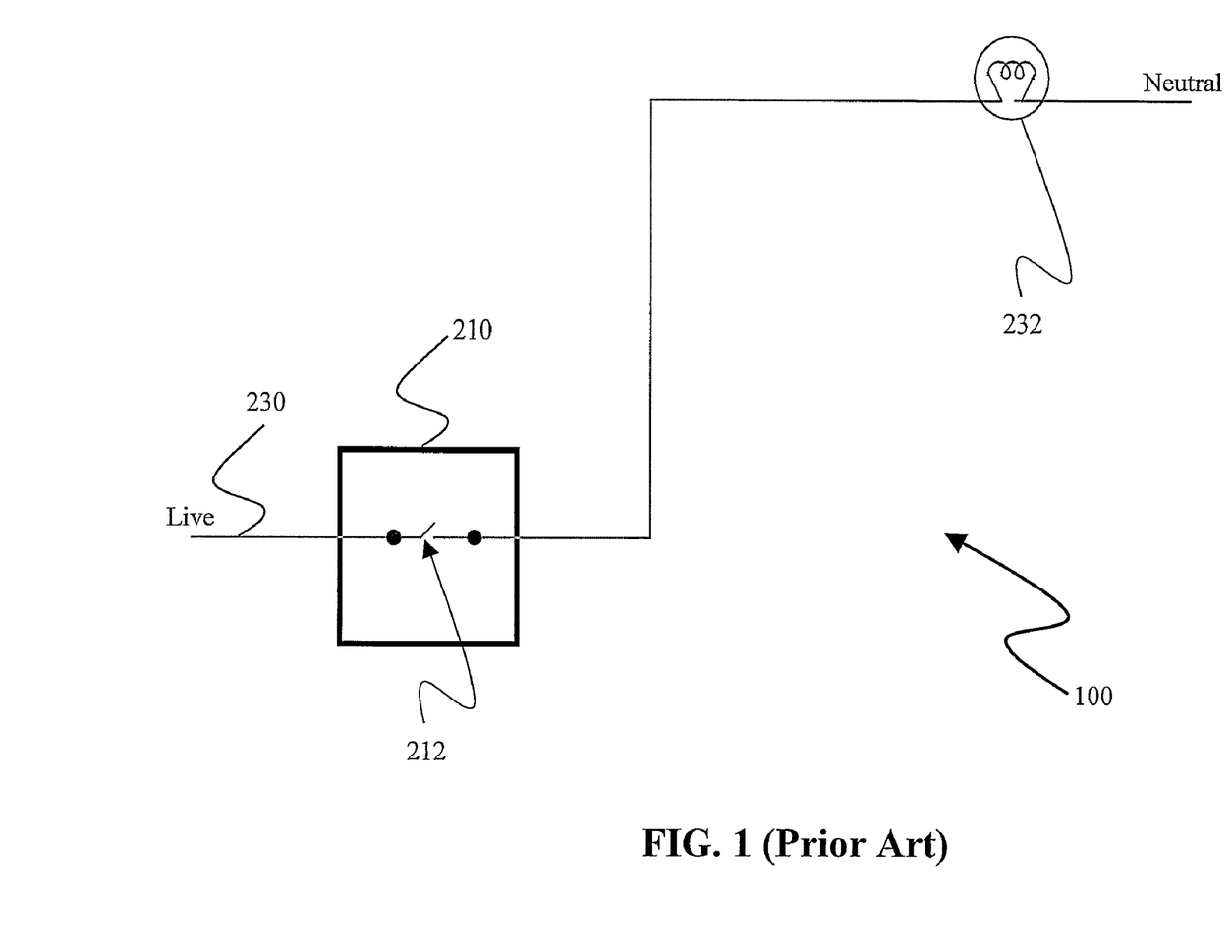
FIG. 1 shows a schematic of a conventional lighting circuit.
Figure 2:
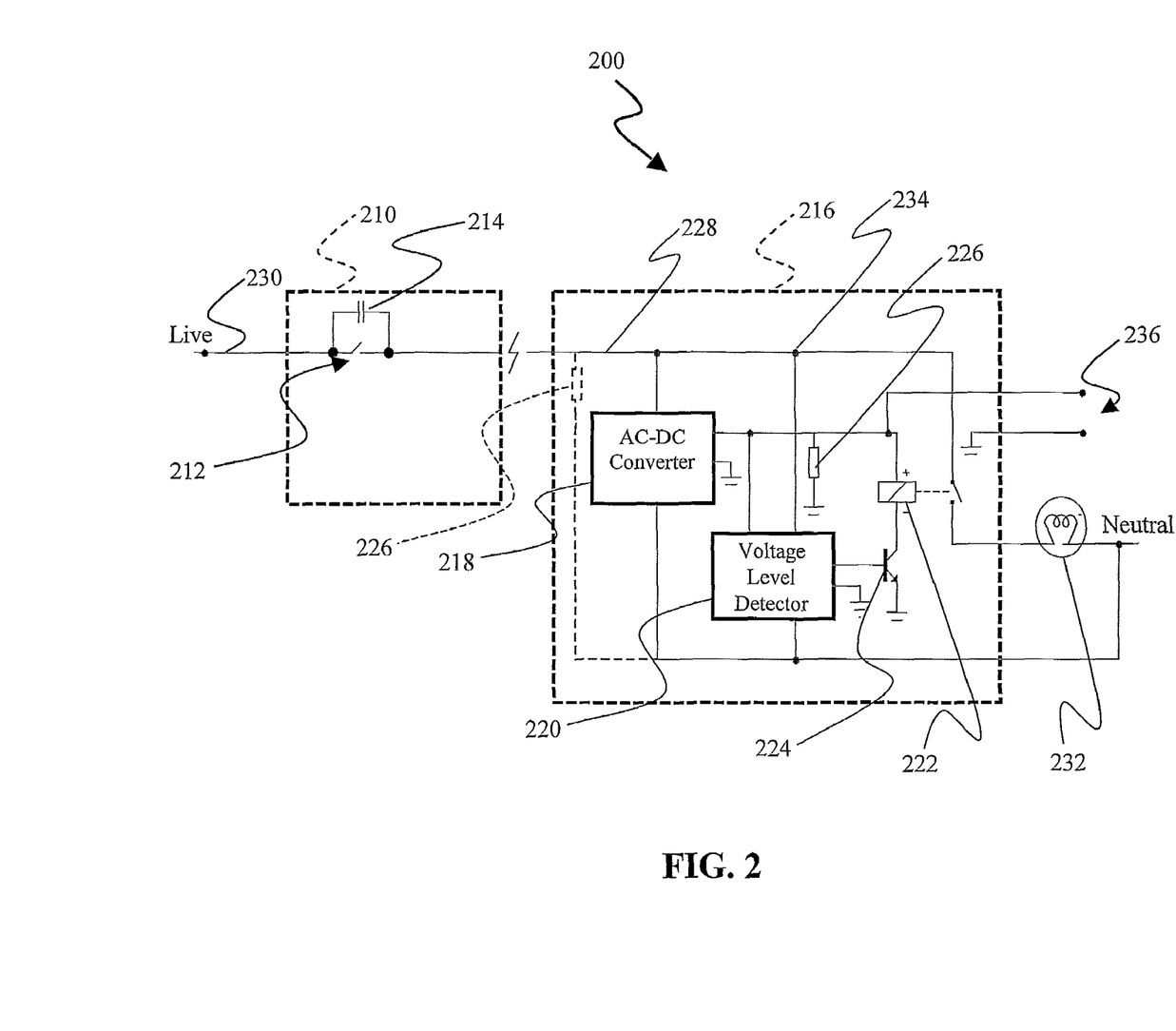
FIG. 2 shows a functional circuit diagram of a power supply system according to a first embodiment of the invention when integrated into the conventional lighting circuit of FIG. 1.

A power supply system 200 according to a first embodiment of the invention for providing power supply to electrical equipment from conventional lighting circuits in buildings is described with reference to FIG. 1 and FIG. 2. FIG. 1 shows a schematic of a conventional lighting circuit 100 typically found in homes and buildings while FIG. 2 shows a functional circuit diagram of the power supply system 200. FIG. 2 further shows the power supply system 200 integrated into the conventional lighting circuit of FIG. 1.

The power supply system 200 as shown in FIG. 2 comprises a wall switch unit 210 and a lighting source control unit 216. The wall switch unit 210 functions as a controller, having a supply switch 212 and a capacitor 214 where the capacitor 214 is connected in parallel with the supply switch 212. The lighting source control unit 216 comprises an AC-DC converter 218, a voltage level detector 220, a relay 222 and a transistor 224 that collectively function as a power switching device, and a minimum-load resistor 226. The AC-DC converter 218 is coupled to the voltage level detector 220, the relay 222 and the minimum-load resistor 226 while the collector of the transistor 224 is coupled to the relay 222 and the base of the transistor 224 is coupled to the voltage level detector 220. The minimum-load resistor 226 can alternatively be connected across a supply path 228 and the mains supply Neutral wire instead of being coupled to the AC-DC converter 218. Additionally, each of the AC-DC converter 218, the voltage level detector 220, the transistor 224 and the minimum-load resistor 226 is connected to a common ground or reference voltage. The wall switch unit 210 is connected to the lighting source control unit 216 via the supply path 228.

The wall switch unit 210 electrically interfaces mains supply Live wire 230 (hereinafter known as live wire 230) functioning as a power source and the supply path 228. The live wire 230 provides alternating current (AC) power supply along the supply path 228 from which the voltage level detector 220 and the AC-DC converter 218 receive the AC power supply. The AC power supply has a property such as a voltage level. Examples of the voltage level include peak-to-peak voltage level and root-mean-square voltage level. The supply switch 212 is operable for enabling and disabling provision of the AC power supply from the live wire 230 along the supply path 228 via the supply switch 212, when the supply switch 212 is in a closed state and an open state, respectively. The supply switch 212 can be a mechanical or an electronic device. The capacitor 214 is preferably of at least 330 nF and is for providing the AC power supply at reduced AC voltage level from the live wire 230 along the supply path 228 when the supply switch 212 is in the opened state.

In the lighting source control unit 216 of the power supply system 200, the AC-DC converter 218 converts the AC power supply that is received from the supply path 228 into direct current (DC) power supply. The AC-DC converter 218 provides the voltage level detector 220, the minimum-load resistor 226 and the relay 222 with the DC power supply. The voltage level detector 220 detects the voltage level of the AC power supply and provides a control signal that corresponds with the voltage level. The power switching device receives the control signal provided by the voltage level detector 220 and can either enable or disable the flow of the AC power supply to an AC output, such as a lighting source 232, depending on the control signal received.

To initiate the ON state, the supply switch 212 is in the closed state and full AC power supply voltage level is supplied from the live wire 230 to the supply path 228 via the supply switch 212. The voltage level detector 220 detects from the AC power supply a full voltage level and provides a first control signal that corresponds with the full voltage level. The transistor 224 energises the relay 222 by enabling the flow of the DC power supply from the AC-DC converter 218 through the relay 222 when the transistor 224 receives the first control signal provided by the voltage level detector 220. The relay 222 then enables flow of the AC power supply to the lighting source 232 when the relay 222 is energised. The lighting source 232 is subsequently turned on by the AC power supply received from the supply path 228 via the relay 222.

To initiate the OFF state, the supply switch 212 is in the opened state and the reduced AC power supply voltage level is provided by the live wire 230 to the supply path 228 via the capacitor 214. The voltage level detector 220 detects from the AC power supply a reduced voltage level and provides a second control signal that corresponds with the reduced voltage level. The transistor 224 receives the second control signal provided by the voltage level detector 220 and disables the flow of the DC power supply from the AC-DC converter 218 to the relay 222. This de-energises the relay 222, which in turn disables the flow of the AC power supply to the lighting source 232 and the lighting source 232 is then turned off. Additionally, when in the OFF state, the lighting source 232 is isolated from a node 234 as the relay 222 is de-energised and this prevents voltage at the node 234 from being pulled down by the lighting source 232.

A DC output 236 is coupled to the AC-DC converter 218 for receiving the DC power supply from the AC-DC converter 218 and is also connected to the common ground or reference voltage. The AC-DC converter 218 operates with the full AC power supply voltage level in the ON state and the reduced AC power supply voltage level in the OFF state to provide uninterrupted, continuous DC power supply to the DC output 236 during both the ON and OFF states. A first auxiliary device such as electrical equipment or a sensor can then be connected to the DC output 236 for drawing the uninterrupted, continuous DC power supply therefrom without being affected by the operation of turning on or off the lighting source 232.

Considerations must be taken to ensure proper functioning of the power supply system 200 of FIG. 2. The considerations include insufficient loading on the supply path 228 in the OFF state. When this happens, voltage level at the node 234 may rise to a high level such that it is difficult for the voltage level detector 220 to distinguish the OFF state from the ON state. The minimum-load resistor 226 prevents the above-mentioned situation from taking place as the minimum-load resistor 226 reduces the voltage level at the node 234. As a result, the voltage level detector 220 receives a low voltage level and is able to distinguish the OFF state from the ON state. Another consideration includes a situation where there is exceeding DC loading. In this situation, the AC-DC converter 218 draws more AC power supply from the supply path 228 and there is an exceedingly large voltage drop across the capacitor 214. A maximum loading condition is reached when the voltage level at the node 234 drops to a limit lower than that of the working voltage of the AC-DC converter 218. The AC-DC converter 218 is preferably compatible for use in a 240V AC power supply system and capable of operating at a minimum level of 100V, and can provide 100-200 mA at a 12V DC output with the capacitor 214 preferably of at least 330 nF. This provides sufficient power for powering most small devices and sensors.

Figure 3:
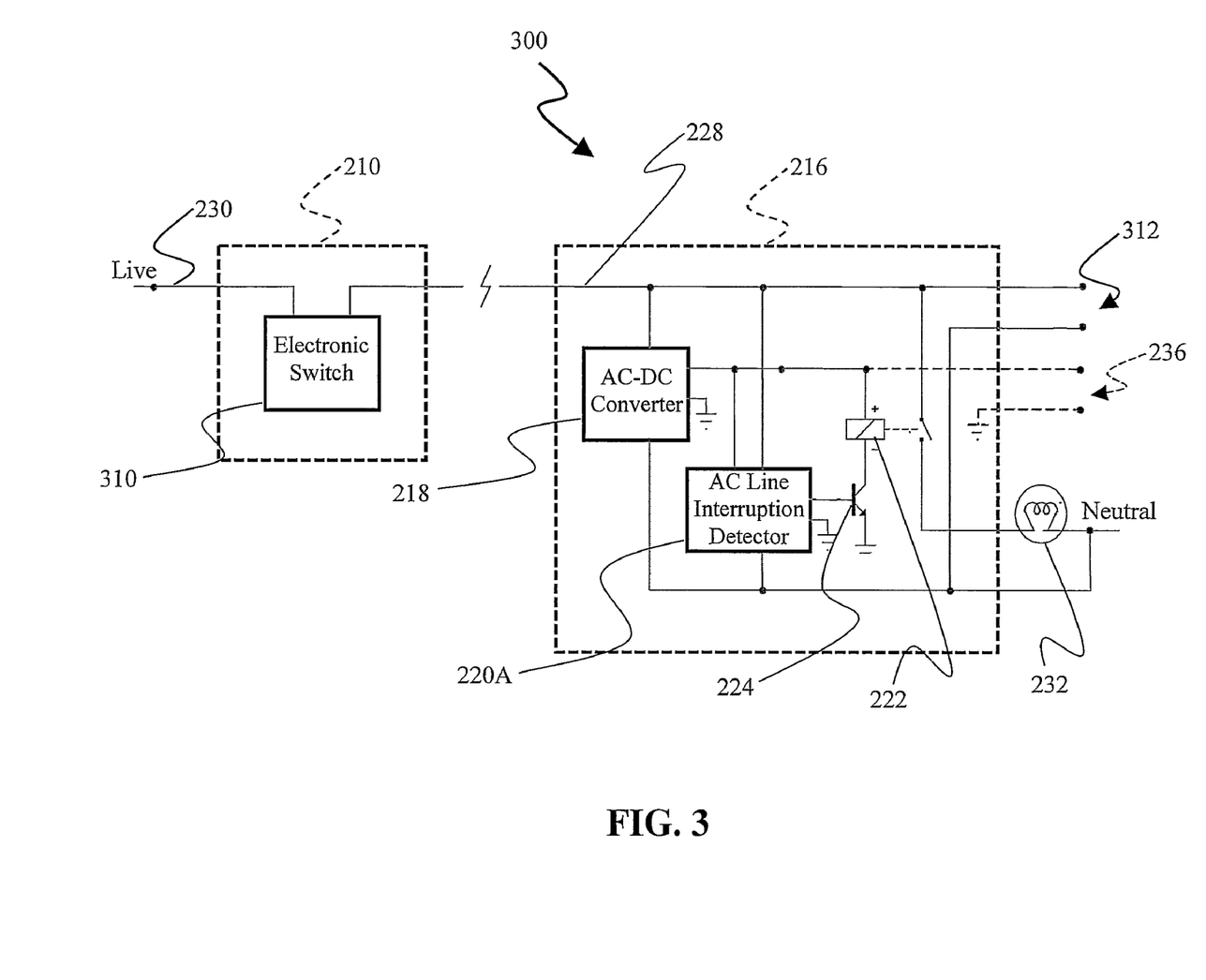
FIG. 3 shows a functional circuit diagram of the power supply system of FIG. 2 according to a second embodiment of the invention.

FIG. 3 shows a functional circuit diagram of a power supply system 300 according to a second embodiment of the invention. The power supply system 300 comprises the wall switch unit 210 functioning as the controller, which consists of an electronic switch 310 instead of the supply switch 212 and the capacitor 214 as in FIG. 2. The electronic switch 310 preferably comprises an electronic circuitry having a power triac, a bridge circuit and a voltage limiting circuit, and a receiver (not shown). Suitable electronic circuitries are known in the art and exemplified in U.S. Pat. No. 6,281,604 B1 which is hereby incorporated by reference. The electronic switch 310 interrupts the voltage waveform of the AC power supply that the electronic switch 310 receives from the live wire 230 by phase chopping the voltage of the AC power supply in a specific pattern. The electronic circuitry determines the specific pattern of the interrupted voltage waveform of the AC power supply along the supply path 228 and the receiver receives signals such as infrared (IR) signals or radio frequency (RF) signals for controlling the wall switch unit 210. The electronic switch 310 continuously provides the AC power supply from the live wire 230 along the supply path 228.

The lighting source control unit 216 of the power supply system 300 of FIG. 3 comprises the AC-DC converter 218, the relay 222 and the transistor 224 that collectively function as the power switching device, and an AC line interruption detector 220A instead of the voltage level detector 220 as in FIG. 2. Further, the lighting source control unit 216 of the power supply system 300 does not comprise of the minimum-load resistor 226 as in FIG. 2. Additionally, each of the AC-DC converter 218, the AC line interruption detector 220A and the transistor 224 is connected to the common ground or reference voltage. The AC-DC converter 218 is coupled to the AC line interruption detector 220A and the relay 222 while the collector of the transistor 224 is coupled to the relay 222 and the base of the transistor 224 is coupled to the AC line interruption detector 220A. Similar to the circuit in FIG. 2, the wall switch unit 210 is connected to the lighting source control unit 216 via the supply path 228. The AC-DC converter 218 provides the DC power supply to the AC line interruption detector 220A. The AC line interruption detector 220A detects the AC power supply having the interrupted voltage waveform and provides a control signal that corresponds with the interrupted voltage waveform of the AC power supply.

Figure 4:
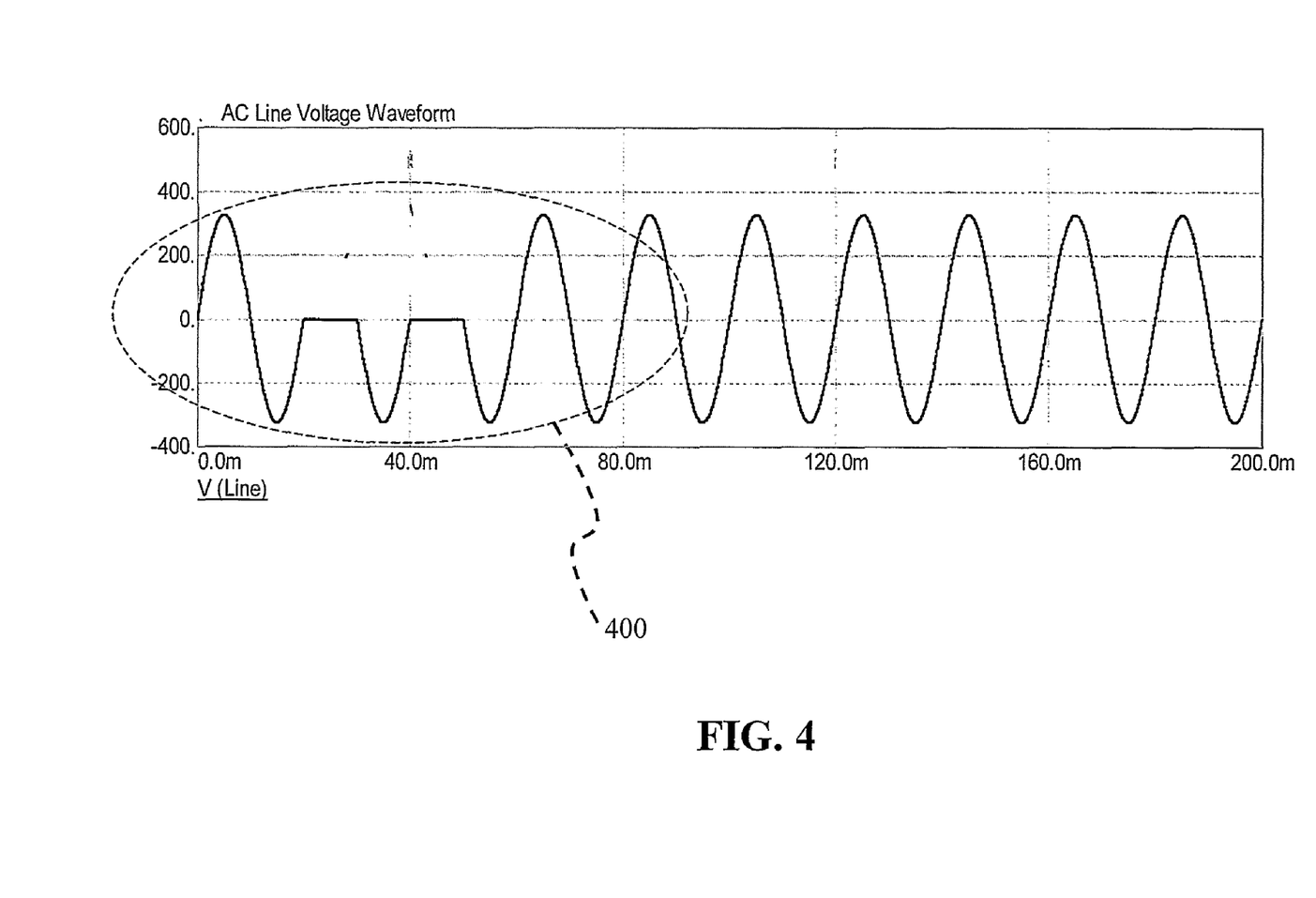
FIG. 4 shows a diagram of an AC line voltage waveform with a first interrupted voltage waveform to initiate an ON state of the circuit in FIG. 3.

To initiate the ON state, the electronic switch 310 provides a first interrupted voltage waveform, such as the AC line voltage waveform 400 in which two consecutive upper half cycles are phase chopped, as shown in FIG. 4. When the AC line interruption detector 220A detects the first interrupted voltage waveform, the AC line interruption detector 220A provides a first control signal that corresponds with the first interrupted voltage waveform. The transistor 224 receives the first control signal provided by the AC line interruption detector 220A and enables the flow of the DC power supply from the AC-DC converter 218 through the relay 222. This energises the relay 222 which enables the flow of the AC power supply to the lighting source 232. The lighting source 232 is then turned on by the AC power supply provided by the supply path 228 via the relay 222.

Figure 5:
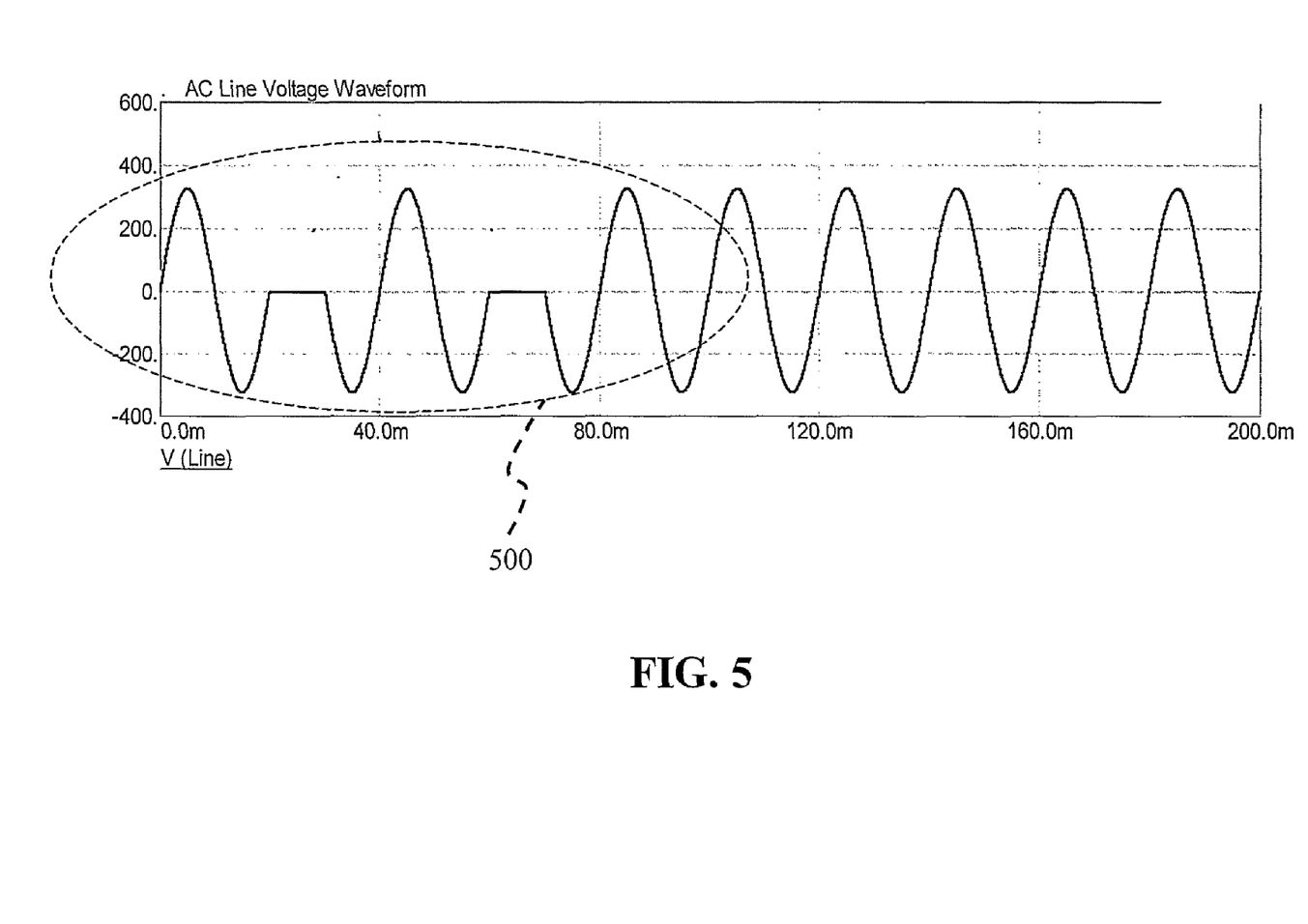
FIG. 5 shows a diagram of an AC line voltage waveform with a second interrupted voltage waveform to initiate an OFF state of the circuit in FIG. 3.

To initiate the OFF state, the electronic switch 310 provides a second interrupted voltage waveform, such as the AC line voltage waveform 500 in which two alternate upper half cycles are phase chopped, as shown in FIG. 5. The AC line interruption detector 220A, upon detecting the second interrupted voltage waveform, provides a second control signal that corresponds with the second interrupted voltage waveform.

The transistor 224 receives the second control signal provided by the AC line interruption detector 220A and disables the flow of the DC power supply from the AC-DC converter 218 through the relay 222. This de-energises the relay 222 which disables the flow of the AC power supply to the lighting source 232, hence, turning the lighting source 232 off.

Figure 6:
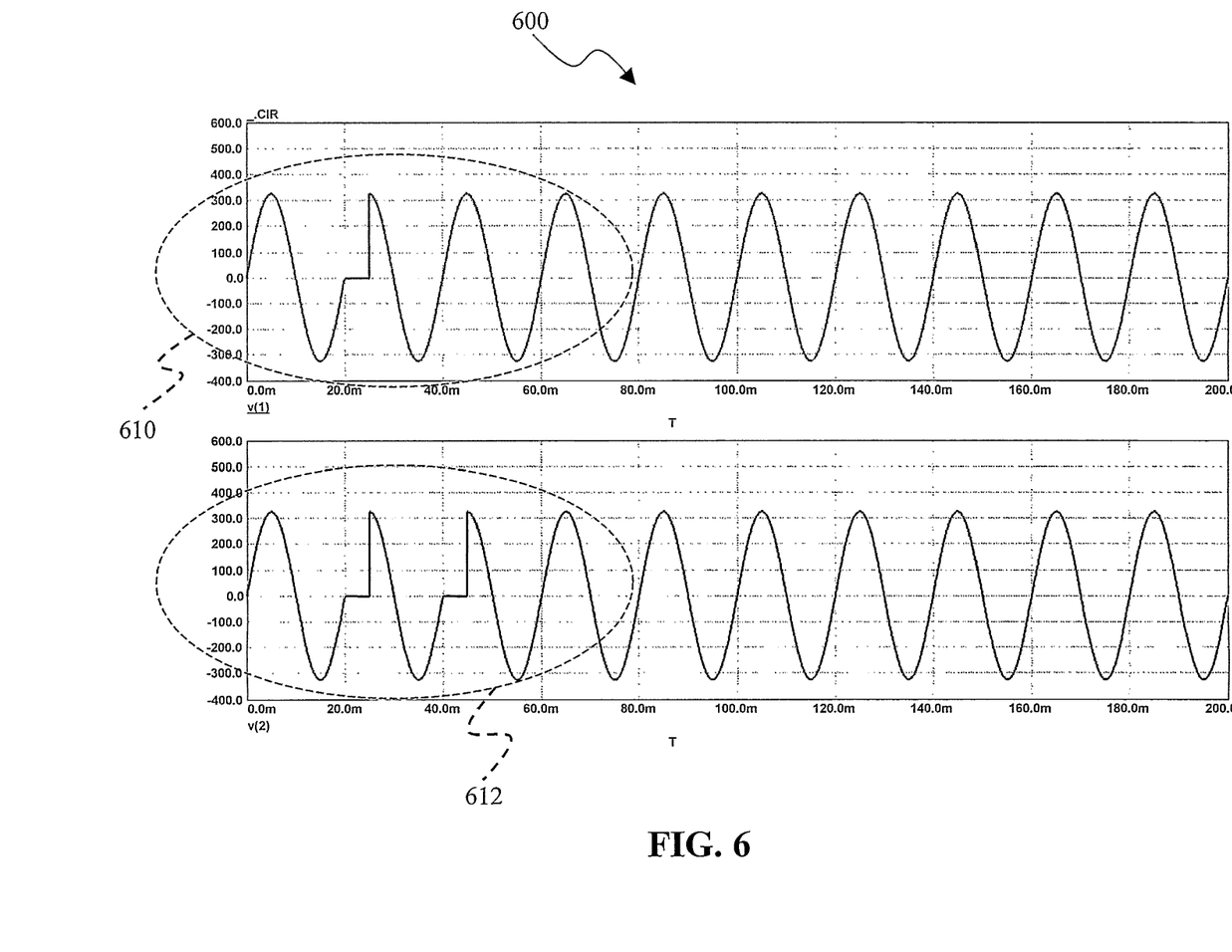
FIG. 6 shows a diagram of two AC line voltage waveforms with a third interrupted voltage waveform and a fourth interrupted voltage waveform to initiate the ON state and the OFF state, respectively, of the circuit in FIG. 3.

The AC line voltage waveforms 600 as shown in FIG. 6 illustrate a third interrupted voltage waveform 610, in which the rising half of an upper half cycle is phase chopped, and a fourth interrupted voltage waveform 612, in which the rising half of two consecutive upper half cycles are chopped. The third interrupted voltage waveform 610 and the fourth interrupted voltage waveform 612 can also be used to initiate the ON state and the OFF state respectively. Besides the four interrupted voltage waveforms mentioned, the interrupted voltage waveforms can also take on other forms and can be arranged in a variety of sequence to initiate the ON state and the OFF state. The voltage of the AC power supply can also be interrupted by alternative techniques such as voltage clipping and voltage clamping. The AC line interruption detector 220A can be of an appropriate design to detect the other forms of the interrupted voltage waveforms accordingly.

An auxiliary output 312 is connected to the supply path 228 for receiving uninterrupted, continuous AC power supply provided by the supply path 228 in both the ON and OFF states. A second auxiliary device is connectible to the auxiliary output 312 and is able to receive the uninterrupted, continuous AC power supply provided by the auxiliary output 312 without being affected by the operation of turning on or off the lighting source 232. The amount of power provided to the second auxiliary device 312 is limited by the wiring capacity in the power supply system 300 or that of the electronic switch 310. The DC output 236 connected to the common ground or reference voltage as in FIG. 2 can also be coupled to the AC-DC converter 218 for receiving the DC power supply from the AC-DC converter 218. The first auxiliary device can then be connected to the DC output 236 for drawing the uninterrupted, continuous DC power supply therefrom without being affected by the operation of turning on or off the lighting source 232.

In order to ensure reliable functioning of the power supply system 300, interrupted voltage waveform patterns used are preferably distinct from common interrupted voltage waveform patterns that commonly occur in any power supply system due to interference. The choice of chopped half cycles, such as the AC line voltage waveform 400, the AC line voltage waveform 500 and the AC line voltage waveform 600 as shown in FIG. 4, FIG. 5 and FIG. 6 respectively, offers a reliable performance against possible erratic operation arising from inherent spurious interrupted voltage waveform patterns in power supply systems.

Figure 7:
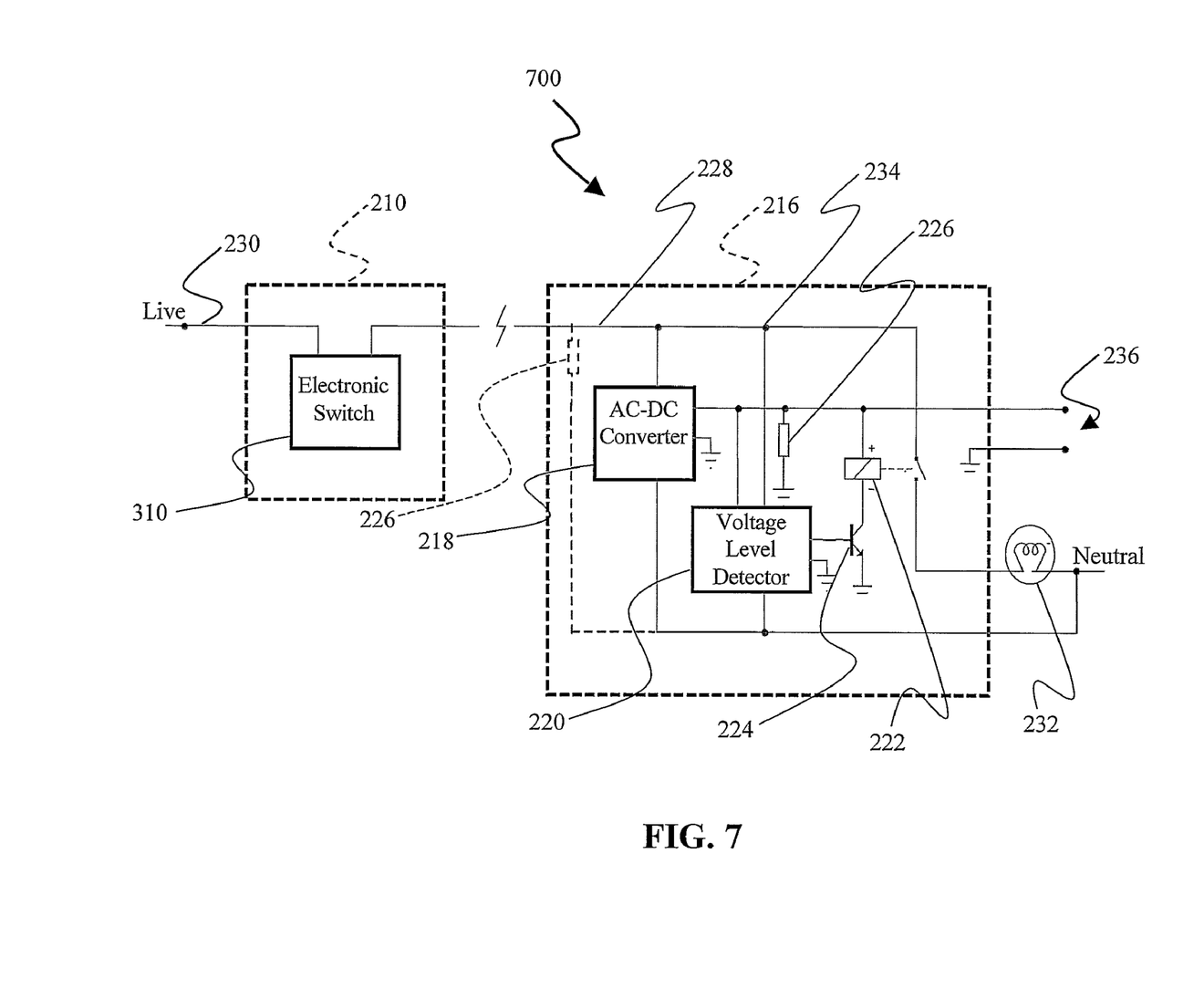
FIG. 7 shows a functional circuit diagram of the power supply system of FIG. 2 according to a third embodiment of the invention.
Figure 8:
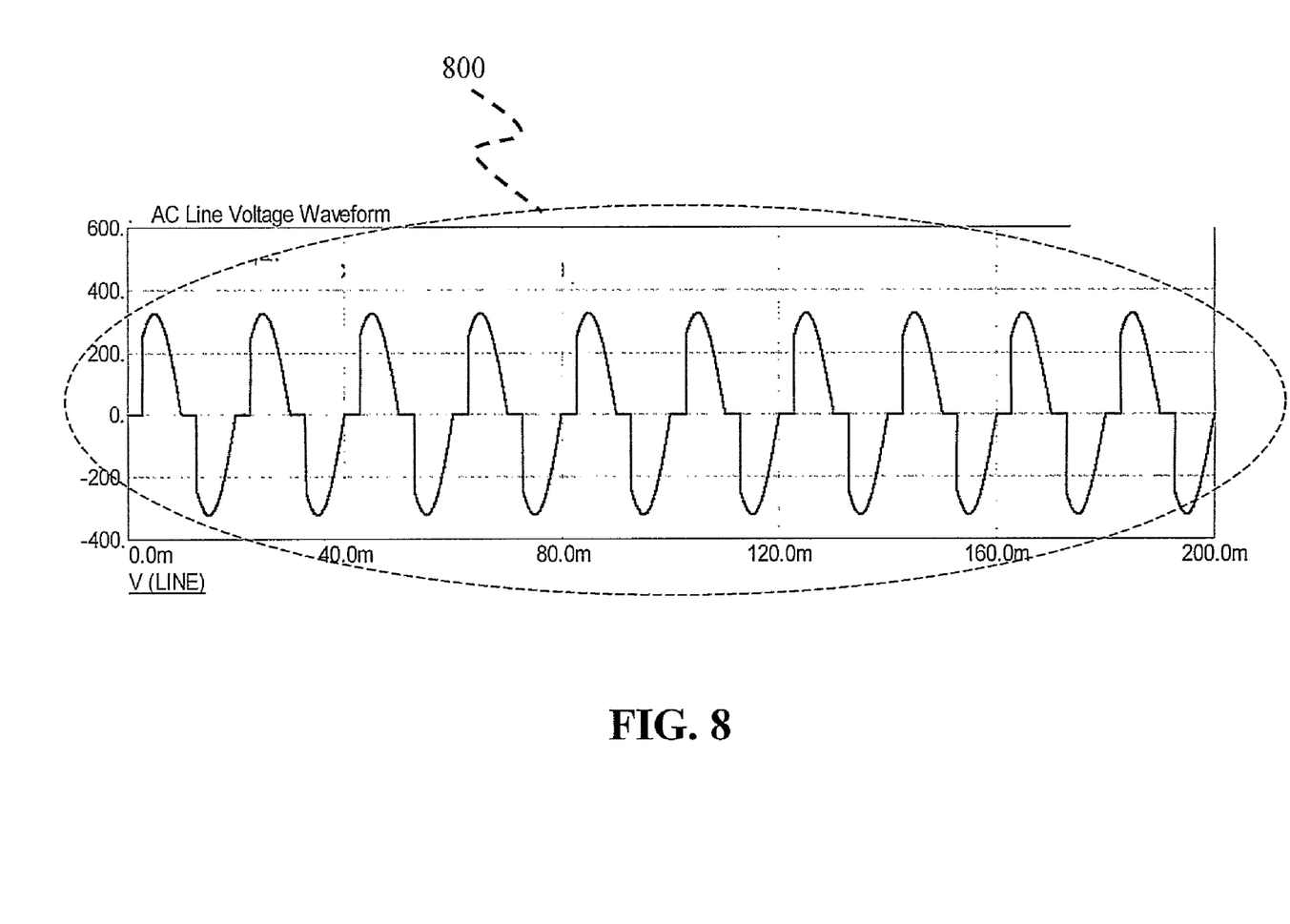
FIG. 8 shows a diagram of a phase-chopped AC line voltage waveform to initiate an OFF state of the circuit in FIG. 7.

A power supply system 700 according to a third embodiment of the invention as shown in FIG. 7 comprises the wall switch unit 210 and the lighting source control unit 216 as in the power supply system 200 of FIG. 2 with the exception that the controller consists of the electronic switch 310 as in FIG. 3 instead of the supply switch 212 and the capacitor 214. Instead of initiating the OFF state using the reduced AC power supply voltage level to obtain the reduced voltage level as in the power supply system 200 of FIG. 2, the AC line voltage waveform 800 in which the beginning portion of each half cycle of the AC line voltage is phase chopped as shown in FIG. 8 can also produce the reduced AC power supply voltage level needed to initiate the OFF state.

Analogous to the power supply system 200 of FIG. 2, the DC output 236 is coupled to the AC-DC converter 218 for receiving the DC power supply from the AC-DC converter 218. The AC-DC converter 218 provides the DC power supply to the DC output 236 during both the ON and OFF states and the first auxiliary device can then be connected to the DC output 236 for drawing the uninterrupted, continuous DC power supply therefrom without being affected by the operation of turning on or off the lighting source 232.

In the foregoing manner, a power supply system and a method for providing power supply to electrical equipment from conventional lighting circuits in buildings are described according to three specific embodiments of the invention for addressing the foregoing disadvantages of conventional methods. Although only three embodiments of the invention are disclosed, the invention is not to be limited to the specific forms or arrangements of parts so described and it will be apparent to one skilled in the art in view of this disclosure that numerous changes and/or modification can be made without departing from the scope and spirit of the invention.

The invention claimed is:

1. A power supply system comprising:
    a detector for receiving alternating current (AC) power supply having at least one property being detectable by the detector, the detector for providing one of a plurality of control signals corresponding with the at least one property detectable by the detector;
    a converter for converting the AC power supply into direct current (DC) power supply; and
    a power switching device for receiving the one of a plurality of control signals from the detector, the one of a plurality of control signals for one of enabling and disabling switching of the power switching device for one of enabling and disabling flow of the AC power supply to an AC output.

2. The system as claimed in claim 1, the detector further comprising:
    a voltage level detector for detecting changes in voltage level of the AC power supply, the voltage level being one of the at least one property of the AC power supply.

3. The system as claimed in claim 1, the detector further comprising:
    an interruption detector for determining interruption in the AC power supply, the interruption being one of the at least one property of the AC power supply.

4. The system as claimed in claim 1, wherein the converter activates the detector by providing the DC power supply thereto.

5. The system as claimed in claim 4, the power switching device comprising:
    a relay for receiving the DC power supply from the converter; and
    a transistor electrically coupled to the relay, the transistor for enabling flow of the DC power supply through the relay for energising the relay when the one of the plurality of control signals is received by the transistor, and the relay enables flow of the AC power supply to the AC output when being energised.

6. The system as claimed in claim 1, the AC output being connectible to a lighting source, the lighting source being turned on by the AC power supply.

7. The system as claimed in claim 1, further comprising:
    a minimum-load resistor electrically interfacing the converter and a ground for providing minimum loading to the DC power supply converted by the converter.

8. The system as claimed in claim 1, further comprising:
    a power source for supplying the current to a supply path wherefrom the detector and the converter receive the AC power supply.

9. The system as claimed in claim 8, further comprising:
    a controller interfacing the power source and the supply path for controlling the at least one property of the AC power supply.

10. The system as claimed in claim 9, the controller comprising:
    a supply switch; and
    a capacitor electrically coupled in parallel with the supply switch, the supply switch being operable for one of enabling and disabling supply of the AC power supply from the power source to the supply path via the supply switch.

11. The system as claimed in claim 9, the controller comprising:
    an electronic circuitry for controlling the at least one property of the AC power supply along the supply path.

12. The system as claimed in claim 11, the controller comprising:
    a receiver for receiving one of infrared (IF) signals and radio frequency (RF) signals for controlling the controller.

13. The system as claimed in claim 8, further comprising:
    an auxiliary output electrically coupled to the supply path for providing the AC power supply to at least one auxiliary device.

14. The system as claimed in claim 1, further comprising:
    a DC output for receiving the DC power supply from the converter and for providing the DC power supply to at least one auxiliary device.

15. A power supply method comprising the steps of:
    receiving alternating current (AC) power supply by a detector, the AC power supply having at least one property detectable by the detector;
    correlating the at least one property to one of a plurality of control signals by the detector;
    providing direct current (DC) power supply being converted from the AC power supply by a converter; and
    receiving the one of a plurality of control signals by a power switching device, the one of a plurality of control signals for one of enabling and disabling switching of the power switching device for one of enabling and disabling flow of the AC power supply to an AC output.

16. The method as claimed in claim 15, further comprising the step of:
    providing a controller for controlling the at least one property of the AC power supply.

17. The method as claimed in claim 15, the step of providing the AC power supply to an AC output comprising the step of:
    providing the AC power supply to a lighting source coupled to the AC output.

18. The method as claimed in claim 15, further comprising the step of:
    providing a minimum-load resistor electrically interfacing the converter and a ground for providing minimum loading to the DC power supply converted by the converter.

19. The method as claimed in claim 15, further comprising the step of:
    providing the AC power supply to an auxiliary output, the auxiliary output for providing the AC power supply to at least one auxiliary device.

20. The method as claimed in claim 15, further comprising the step of:
    providing the DC power supply to a DC output, the DC output for providing the DC power supply to at least one auxiliary device, and the DC power supply being converted from the AC power supply by the converter.

* * * * *